United States Patent [19]

Puschak et al.

[11] Patent Number: 5,849,833
[45] Date of Patent: Dec. 15, 1998

[54] METHOD FOR IMPROVING DRYING SPEED IN PRINTING PROCESS AND FAST DRY PRINTING INK USED THEREIN

[75] Inventors: Caren Ann Puschak, Norristown, Pa.; Anne Margarat Bacho, Delran, N.J.; Gary Robert Larson, Hatfield, Pa.; Matthew Stewart Gebhard, New Britain, Pa.; Alvin Charles Lavoie, Lansdale, Pa.

[73] Assignee: Rohm and Haas Company, Philadelphia, Pa.

[21] Appl. No.: 677,998

[22] Filed: Jul. 10, 1996

Related U.S. Application Data

[60] Provisional application No. 60/001,316 Jul. 21, 1995.
[51] Int. Cl.$^6$ ................................................ C08L 27/00
[52] U.S. Cl. ............................................................. 524/521
[58] Field of Search ............................................. 524/521

[56] References Cited

U.S. PATENT DOCUMENTS

| | | | |
|---|---|---|---|
| 3,891,581 | 6/1975 | Argenio | 260/16 |
| 4,072,644 | 2/1978 | Hedrick | 260/29.6 HN |
| 4,119,600 | 10/1978 | Bakule et al. | 260/296 RW |
| 4,137,083 | 1/1979 | Hedrick | 106/20 |
| 4,154,618 | 5/1979 | Burke | 106/27 |
| 5,098,478 | 3/1992 | Krishnan et al. | 106/23 |
| 5,229,168 | 7/1993 | Richard et al. | 427/261 |
| 5,266,162 | 11/1993 | Richard et al. | 162/135 |
| 5,302,193 | 4/1994 | Wouch et al. | 106/20 R |

FOREIGN PATENT DOCUMENTS

| | | |
|---|---|---|
| 5753512 | 3/1982 | Japan . |
| 62-019476 | 1/1987 | Japan . |
| 62-060212 | 3/1987 | Japan . |
| 6-013656 | 2/1994 | Japan . |
| 2-572585 | 1/1997 | Japan . |

OTHER PUBLICATIONS

"Standard Test Methods For Drying, Curing, or film formation of Organic Coatings at Room Temperature", ASTM Standards, Designation: D 1640–83, PP. 242–245 (1989).

*Primary Examiner*—Edward J. Cain
*Attorney, Agent, or Firm*—Sudhir G. Deskmukh

[57] ABSTRACT

The present invention relates to fast drying waterborne printing inks and to method of using such inks in high speed printing processes, such rotogravure and flexographic printing processes. The printing ink includes, for example, a blend of a latex binder and a polyfunctional amine. The pH of the ink is raised by adding a sufficient amount of base, to a point where essentially all of the polyfunctional amine in the blend is in a deprotonated state.

14 Claims, No Drawings

METHOD FOR IMPROVING DRYING SPEED IN PRINTING PROCESS AND FAST DRY PRINTING INK USED THEREIN

This is a nonprovisional application of prior pending provisional application Ser. No. 60/001,316, filed Jul. 21, 1995.

This invention generally relates to a high speed printing process and more particularly to improving drying speed of a print pattern applied over a substrate utilizing a printing ink having fast drying characteristics.

Printing inks are employed in the graphic arts areas as a medium by which, for example, desired black or colored print patterns are produced on a substrate surface, such as, paper, news print, cardboard, plastic film, corrugated board and fabric surface. Printing inks are used to produce black or colored print patterns, such as, written text, art works or figures, by transferring printing inks in a predetermined fashion to selected areas of the substrate surfaces. Applying means, such as, printing presses, are generally employed in carrying out the transfer of a printing ink to such selected areas on the substrate surfaces.

One way to classify printing inks is in accordance with the type of printing process used in depositing a printing ink on a substrate surface. Certain types of printing processes, such as, lithography, require relatively viscous inks having a paste like consistency while others, such as, rotogravure, letter press and flexography, require relatively fluid fast drying inks.

Fast drying fluid inks used in rotogravure, letter press and flexographic printing processes are characterized by their high degree of fluidity achieved by providing the printing inks with a viscosity in the range of from 50 to 1000 cps. Due to high printing speed rates of such printing processes, the speed with which the printing ink dries is of crucial importance. If the printing ink fails to dry sufficiently fast it may cause the printed substrates, such as, printed sheets of papers, to stick together or for print pattern on the printed surface to become disfigured during the printing process, thereby ruining the print pattern on the printed substrates. In particular, the rotogravure printing process, which is generally used to print magazines and catalogs at fast line speeds, requires a fast drying printing ink. Line speeds of 609 to 945 meters per minute are typically employed in a conventional rotogravure printing process.

The rotogravure printing process is an intaglio printing process wherein the printing ink is transferred to a substrate from small recessed cells engraved on a printing plate provided with a cylindrical shape. For example, in multi-color printing processes, typically, up to four separate colored ink layers are sequentially deposited on a substrate at high speeds, typically in less than a second, from sequentially positioned rotogravure cylinders. In order to prevent blemishing of the print pattern on a print substrate, it therefore becomes necessary to have the previously deposited colored ink layer sufficiently dry before a subsequent colored ink layer is deposited thereon. Thus, fast drying fluid printing inks are crucial to prevent such blemishing of print pattern when high speed rotogravure printing processes are employed.

Flexographic printing is a relief printing process that generally utilizes a rotary process employing a rubber or photopolymer printing plate and an inking system that dispenses fast drying fluid printing inks on a print substrate at high print speeds. The image area on the rubber or photopolymer printing plate is raised above the non-printing areas and the image area is inked from an Anilox roller, which is a screened inking roller having cells of uniform size and depth engraved therein. Similar to the rotogravure printing process, flexographic printing process is generally carried out at high speeds utilizing several colors. Thus, the same concerns as those described earlier regarding drying rates of printing inks have relevance in the flexographic printing process.

Letter press printing is another type of relief printing process in which an image area on a printing plate is raised above the non-printing areas, and the image area is inked by rollers and pressed into contact with substrate. As with rotogravure and flexographic printing, letter press may be employed to print several colors at high speeds. Thus, the same concerns as those described earlier regarding drying rates of printing inks have relevance in the letter press printing process.

Currently, a number of fluid printing inks achieve desired fast drying speeds by utilizing organic solvents, such as, toluene, as an evaporable carrier. Due to the high volatility of such organic solvents, such inks typically dry at high speeds by solvent evaporation. However, worker safety and environmental considerations are forcing the printing industry to make changes in printing ink formulations aimed at minimizing the release into the atmosphere of volatile organic components (VOC) used in the printing ink formulations. Under the increasingly stricter standards of The Clean Air Act high levels of VOC and hazardous air pollutants (HAP) emissions produced by the traditional printing processes must be substantially reduced. Furthermore, recently enacted Achievable Control Technology (MACT) guidelines, are imposing more stringent solvent recovery or solvent incineration requirements on the printing industry. In addition to environmental considerations, solvent based printing inks tend to be highly flammable. As a result, such printing inks pose a fire hazard to workers using such printing inks.

Therefore, organic solvent-based inks are now regarded as undesirable and are currently in use only because effective water-based ink compositions have not yet been fully developed as replacements for organic solvent-based printing inks. In particular, the slow drying speed of current water-based printing ink technology results in high speed printing presses being operated at significantly reduced line speeds.

Water-based ink compositions have been disclosed in U.S. Pat. No. 5,098,478 ('478 patent) to Krislnan et al. However, the '478 patent failed to address the problem of low drying speeds typically associated with water based printing inks. The present invention solves the problem of low drying speeds of water-based printing inks.

The present invention is directed to a printing ink composition comprising:
  a base, and
  (a) a blend of a latex binder with 0 to 20 weight percent based on the total weight of binder solids of a polyfunctional amine, or
  (b) an amine modified latex binder, or
  (c) a combination of said blend and said amine modified latex binder,
  wherein said latex binder and said amine modified latex binder are anionically stabilized, and
  wherein said latex binder comprises an amount of said base sufficient to raise the pH of said latex binder to a point wherein essentially all of said polyfunctional amine in said blend, or essentially all of said amine modified latex binder, or essentially all of said combination of said blend and said amine modified latex binder is in a deprotonated state.

The present invention is also directed to a method for increasing the drying speed of a desired print pattern deposited on a substrate, said method comprising:
  depositing one or more layers of a printing ink composition on the surface of said substrate, said ink composition comprising:
  a base, and
    (a) a blend of a latex binder with 0 to 20 weight percent based on the total weight of latex binder solids of a polyfunctional amine, or (b) an amine modified latex binder, or (c) a combination of said blend and said amine modified latex binder, wherein said latex binder and said amine modified latex binder are anionically stabilized, and wherein said latex binder comprises an amount of said base sufficient to raise the pH of said latex binder to a point wherein essentially all of said polyfunctional amine in said blend, or essentially all of said amine modified latex binder, or essentially all of said combination of said blend and said amine modified latex binder is in a deprotonated state; and drying said one or more layers of said ink composition on said substrate surface to produce said desired print pattern thereon.

As used herein:

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976, utilizing polymethyl methacrylate as the standard.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to –100° C., and then heated to 150° C. at a rate of 20° C./minute while data was being collected. The Tg was measured at the midpoint of the inflection using the half-height method.

"Latex binder" means "Dispersed polymer", "Solubilized polymer" (both defined below), or a mixture thereof.

"Dispersed polymer" means a colloidal dispersion of polymer particles in an aqueous carrier. "Solubilized polymer" includes "Water soluble polymer", "Water reducible polymer" or a mixture thereof. Water soluble polymer means a polymer dissolved in water. Water reducible polymer means a polymer dissolved in water and water miscible solvent. Solubilized polymer results in a polymer solution characterized by having the self-crowding constant (K) of the Mooney equation $[1/\ln_{\eta_{rel}}=1/BC-K/2.5]$ equal to zero. By contrast, dispersed polymer has (K) equal to 1.9. The details of Mooney equation are disclosed in an article entitled "*Physical Characterization of Water Dispersed and Soluble Acrylic Polymers*" by Brendley et al., in "Nonpolluting Coatings and Coating Processes" published by Plenum Press, 1973 and edited by Gordon and Prane.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series. To measure the particle diameter, 0.1 to 0.2 grams of a sample of acrylic polymer was diluted to a total of 40 milliliters (mLs) with distilled water. A two mLs portion was delivered into an acrylic cell, which was then capped. The particle size in nanometers was measured for 1000 cycles. The measurement was repeated three times and an average was reported.

"Latex binder solids" means the latex binder in its dry state.

"Line speed" means the rate at which the substrate is fed through the printing press, and is measured in terms of linear meter per minute.

"Blemish" means a smearing or other disfiguring of a print pattern produced from a printing ink on a substrate.

The printing ink composition of the preferred embodiment of the present invention includes a blend of a latex binder and a polyfunctional amine. The blend includes from 80 percent to 100 percent, preferably from 90 percent to 99.5 percent, more preferably from 95 percent to 98 percent, of the latex binder, all in weight percentages based on the total weight of blend solids. The blend further includes from 0 to 20 percent, preferably 0.5 to 10, and more preferably 2 to 5 percent, of the polyfunctional amine, all in weight percentages based on the total weight of the blend solids.

The latex binder, which is anionically stabilized, is provided with a Tg in the range varying from –20° C. to 150° C., preferably from 0° C. to 100° C., more preferably in the range varying from 10° C. to 70° C., a GPC weight average molecular weight in the range varying from 500 to 5,000,000, more preferably varying from 1,000 to over 1000,000, and most preferably varying from 30,000 to 500,000.

The latex binder of the composition may be a dispersed polymer having polymer particles dispersed in an aqueous evaporable carrier or it may either be a water soluble polymer, a water-reducible polymer, a mixture of the water soluble and water-reducible polymers in the aqueous evaporable carrier, or a mixture of the dispersed, water-reducible and water soluble polymers in the aqueous evaporable carrier. If desired the latex binder may include a mixture of a dispersed polymer with a water soluble or a water-reducible polymer. The latex binder in the form of a dispersed polymer having particles with a particle size in the range of from 20 to 1000 nanometers, preferably in the range of from 30 to 300 nanometers, is preferred. The aqueous evaporable carrier includes water or water having dissolved therein a water miscible organic solvent, such as, methanol, ethanol and glycol ethers. Water is preferred.

The latex binder is polymerized from at least one or more of the following monomers, such as, for example, acrylic and methacrylic ester monomers including methyl (meth) acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth) acrylate, oleyl (meth)acrylate, palmityl (meth)acrylate, stearyl (meth)acrylate, hydroxyethyl (meth)acrylate, and hydroxypropyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; diacetone acrylamide; glycidyl methacrylate; acetoacetyl ethylmethacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N'-dimethylamino (meth)acrylate and acrylonitrile or methacrylonitrile.

If desired, at least one of the monomers utilized in the preparation of the latex binder, may be an acid or amino functional monomer or a combination of an acid, or amino functional monomers.

The latex binder polymerized from monomeric mixtures that include the following monomers, is more preferred:

1) butyl acrylate and methyl methacrylate, 2) butyl acrylate and styrene, 3) 2-ethyl hexyl acrylate with methyl methacrylate, and 4) 2-ethyl hexyl acrylate with styrene.

Preferably the monomeric mixture further includes an acrylic or methacrylic acid monomer or a mixture thereof.

The latex binder used in this invention is a substantially thermoplastic or substantially uncrosslinked copolymer when applied to the substrate. If desired, premature crosslinking or gelling of the copolymer is induced by adding to the monomer mix multi-ethylenically unsaturated monomers in the range of 0.1% to 25%, by weight based on the weight of the copolymer. Typical multi-ethylenically unsaturated monomers include allyl methacrylate, diallyl phthalate, 1,4-butylene glycol dimethacrylate, 1,6-hexanedioldiacrylate and divinyl benzene. It is important, however, that the quality of the film formation is not materially impaired.

The polymerization techniques used for preparing the anionically stabilized latex binders of the present invention are well known in the art. The latex binder may be prepared by aqueous solution polymerization or by emulsion polymerization. Emulsion polymerization is preferred. Either thermal or redox initiation processes may be used. Polymers and copolymers of alpha-beta ethylenically unsaturated monomers and their esters, especially the acrylic and methacrylic esters, are preferably prepared by processes given in "Emulsion Polymerization of Acrylic Monomers: May, 1966" published by the Rohm and Haas Company, Philadelphia, Pa.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant such as, for example, sodium bisulfite may be used at similar levels.

Chain transfer agents may be used in an amount effective to provide a GPC weight average molecular weight of 500 to 5,000,000, and preferably from 1,000 to 1,000,000, and more preferably from 3,000 to 500,000. For purposes of regulating molecular weight of the latex binder being formed, suitable chain transfer agents include well known halo-organic compounds such as carbon tetrabromide and dibromodichloromethane; sulfur-containing compounds such as alkylthiols including etlianethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctyl mercaptopropionic acid; isooctylmercapto propionate ("IOMP"); bromoform; bromotrichloromethane ("BTCM"); carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When the latex binder in the form of a dispersed polymer is utilized, the diameter of the polymer particles is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on total weight of total monomer.

Alternatively, the latex binder may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases the majority of the surface area of the particle will be occupied by at least one outer phase and the interior of the latex polymer particle will be occupied by at least one inner phase. The outer phase of the multi-stage polymer particles weighs 5 weight percent to 95 weight percent based on the total weight of the particle. It is often desirable for each stage of the multi-stage polymer particles to have a different Tg. A GPC weight average molecular weight of these multi-stage polymer particles is in the range of from 500 to 5,000,000, preferably from 1000 to 1,000,000, and more preferably from 3,000 to 500,000. If desired, each stage of these multi-stage polymer particles may be provided with different GPC weight average molecular weight, such as, the multi-stage polymer particle composition disclosed in U.S. Pat. No. 4,916,171.

The multi-stage polymer particles are prepared by conventional emulsion polymerization process in which at least two stages differing in composition are formed in a sequential fashion. Such a process usually results in the formation of at least two polymer compositions. Under certain circumstances it may be advantageous to have one of the polymer compositions be soluble in water or under aqueous alkaline conditions (pH>7). Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The latex binder in the form of the water-reducible polymer or water-soluble polymer may be prepared directly in water if the monomer mix is water-soluble or, as is most often the case, the polymerization solvent is a water-miscible solvent, such as, isopropanol, butyl cellosolve, propylene glycol. In such a case, water may be included in the polymerization mixture or post added after the polymerization is complete. Such polymers may be prepared by utilizing the monomers described earlier. Another route to the preparation of a water-soluble polymer for this invention is to prepare a latex polymer having enough acrylic or methacrylic acid or other polymerizable acid monomer (usually greater than 10 percent) such that the latex polymer can be solubilized by the addition of ammonia or other base. Water-soluble polymers of this type are advantageously used as blends with the dispersed polymers.

The latex binder is preferably provided with an acid functional pendant moiety sufficient to provide the latex binder with an acid number in the range of from 0 to 390, preferably in the range of from 0.8 to 390 and more preferably from 0.8 to 200. The desired acid number is achieved by controlling the amount of acid functional monomer utilized in producing the latex binder. The desired range of the acid number is obtained by utilizing the latex binder containing an acid functional monomer, such as, phosphoethyl methacrylate monomer or ethylenically-unsaturated carboxylic acid monomers, such as, acrylic acid, fumaric acid-monoethyl ester, fumaric acid, itaconic acid, maleic acid, maleic anhydride, methacrylic acid, fumaric acid-monomethyl ester, methyl hydrogen maleate, 2-acrylamido-2-methylpropane sulfonic acid, sodium vinyl sulfonate, sulfoethyl methacrylate, or combinations thereof. Preferred ethylenically-unsaturated carboxylic acid monomer is selected from the group consisting of acrylic acid, methacrylic acid, and combinations thereof.

Essentially all of the polyfunctional amine suitable for blending with the latex binder is maintained in a deprotonated state by raising the pH of the aqueous evaporable carrier of the latex binder to the range of from 9 to 11, preferably from 9.5 to 10.5. The pH of the aqueous evaporable carrier is raised by adding a base, such as, ammonia; alkali metal hydroxide, preferably sodium hydroxide; morpholine and the lower alkyl amines, such as, 2-methylaminoethanol, 2-dimethylaminoethanol, N-methylmorpholine and ethylenediamine. Volatile bases, such as, ammonia, or a mixture of volatile bases and nonvolatile bases, such as, sodium hydroxide, are preferred. Ammonia in particular is most preferred. As a result of deprotonation of amine functional groups in the polyfunctional amine, essentially all of amine functional groups are uncharged, i.e., neutralized, thus preserving colloidal stability of the latex binder.

The polyfunctional amine is polymerized from 20 percent to 100 percent, preferably from 50 percent to 100 percent, all in weight percentages based on the total weight of the polyfunctional amine solids of at least one or more classes of the amine containing monomers disclosed below:

Class 1. Aminoalkyl vinyl ethers, wherein alkyl groups may be straight- or branched-chains having two to three carbon atoms and wherein nitrogen atom may be a primary, secondary, or tertiary nitrogen atom. Such a process is disclosed in the U.S. Pat. No. 2,879,178. When the monomer containing a tertiary nitrogen atom is utilized, one of the remaining hydrogen atoms may be substituted by alkyl, hydroxyalkyl, or alkoxyalkyl groups, the alkyl components of which may have one to four carbon atoms, preferably only one carbon atom. Specific examples include: beta-aminoethyl vinyl ether; beta -aminoethyl vinyl sulfide; N-monomethyl-beta-aminoethyl vinyl ether or sulfide; N-monoethyl-beta-aminoethyl vinyl ether or sulfide; N-monobutyl-beta-aminoethyl vinyl ether or sulfide; and N-monomethyl-3-aminopropyl vinyl ether or sulfide.

Class 2. Acrylamide or acrylic esters, such as, those of the formula II:

$$H_2C=C(R)\overset{O}{\overset{\|}{C}}-(X_n)-A-NR^*R^0 \qquad (II)$$

wherein
R is H or $CH_3$;
n is 0 or 1;
X is O or N(H).
When n is zero, A is $O(CH_2)_x$, wherein x is 2 to 3, or (O-alkylene)$_y$; wherein (O-alkylene)$_y$ is a poly(oxyalkylene) group, having a GPC weight average molecular weight in the range from 88 to 348, in which the individual alkylene radicals are the same or different and are either ethylene or propylene; and
when n is 1, A is an alkylene group having 2 to 4 carbon atoms;
$R^*$ is H, methyl, or ethyl; and
$R^0$ is H, phenyl, benzyl, methylbenzyl, cyclohexyl, or $(C_1-C_6)$ alkyl.

Some of the preferred examples of compounds of formula II include:
dimethylaminoethyl acrylate or methacrylate; beta-aminoethyl acrylate or methacrylate; N-beta-aminoethyl acrylamide or methacrylamide; N-(monomethylaminoethyl)-acrylamide or methacrylamide; N-(mono-n-butyl)-4-aminobutyl acrylate or methacrylate; methacryloxyethoxyethylamine; and acryloxypropoxypropoxypropylamine.

Class 3. N-acryloxyalkyl-oxazolidines and N-acryloxyalkyltetrahydro-1,3-oxazines and the corresponding components in which the "alkyl" linkage is replaced by alkoxyalkyl and poly(alkoxy-alkyl), all of which are embraced by Formula III:

$$H_2C=C(R)\overset{O}{\overset{\|}{C}}-A'-N\underset{\underset{R'\quad R^2}{\diagdown\diagup}{C}}{\overset{\diagup C_mH_{2m}}{\diagdown O}} \qquad (III)$$

wherein R is H or $CH_3$;
m is an integer having a value of 2 to 3;
R', when not directly joined to $R^2$, is selected from the group consisting of hydrogen, phenyl, benzyl, and $(C_1-C_{12})$ alkyl groups;
$R^2$, when not directly joined to R', is selected from the group consisting of hydrogen and $(C_1-C_4)$ alkyl groups;
R' and $R^2$, when directly joined together, form a 5- to 6-carbon ring with the attached carbon atom of the ring in the formula, i.e., R' and $R^2$, when joined together, are selected from the group consisting of pentamethylene and tetramethylene; and
A' is $O(C_mH_{2m})$— or (O-alkylene)$_n$ in which (O-alkylene)$_n$ is a poly(oxyalkylene) group, having a GPC weight average molecular weight in the range from 88 to 348 and in which the individual alkylene radicals are the same or different and are either ethylene or propylene.

The compounds of Formula III can hydrolyze under various conditions to secondary amines. The hydrolysis produces products having the Formula IV:

$$H_2C=C(R)\overset{O}{\overset{\|}{C}}-A'-N(H)-(C_mH_{2m})-OH \qquad (IV)$$

The compounds of Formula III are disclosed in U.S. Pat. Nos. 3,037,006 and 3,502,627.

Some of the preferred examples of compounds of Formula III include:
oxazolidinylethyl methacrylate; oxazolidinylethyl acrylate; 3-(gamma-methacryl-oxypropyl)-tetrahydro-1,3-oxazine; 3-( beta -methacryloxyethyl)-2,2-penta-methylene-oxazolidine; 3-(beta -methacryloxyethyl-2-methyl-2-propyloxazolidine; N-2-(2-acryloxyethoxy)ethyl-oxazolidine; N-2-(2-methacryloxyethoxy)ethyl-oxazolidine; N-2-(2-methacryloxyethoxy)ethyl-5-methyl-oxazolidine; N-2-(2-acryloxyethoxy)ethyl-5-methyl-oxazolidine; 3-[2-(2-methacryloxyethoxy)ethyl)]-2,2-penta-methylene-oxazolidine; 3-[2-(2-methacryloxyethoxy)ethyl)]-2,2-dimethyloxazolidine; 3-[2-(methacryloxyethoxy) ethyl]-2-phenyl-oxazolidine; 2-isopropenyl-2-oxazoline.

Class 4. Polymers of monomers which readily generate amines by hydrolysis are also useful in the preparation of the polyfunctional amine. Examples of such monomers are acryloxy-ketimines and acryloxy-aldimines, such as, those of the Formulas V and VI shown below:

$$H_2C=(CR)-COOA''N=Q \qquad (V)$$

$$H_2C=C(R)-CO-(D)_{n''-1}-(B)_{n'-1}-(A^o)_{n^o-1}-N=Q \qquad (VI)$$

wherein R is H or $CH_3$;
Q is selected from the group consisting of $$=C\diagup\overset{R^4}{\diagdown R^5}, \quad =C-(CHR^6)_x-\rceil, \quad \text{and} \quad =CHR^3;$$

$R^6$ is H or it may be methyl in one $CHR_6$ unit;
$R^5$ is selected from the group consisting of $(C_1-C_{12})$-alkyl and cyclohexyl groups;
$R^4$ is selected from the group consisting of $(C_1-C_{12})$-alkyl and cyclohexyl
$R^3$ is selected from the group consisting of phenyl, halophenyl, $(C_1-C_{12})$-alkyl, cyclohexyl, and $(C_1-C_4)$ alkoxyphenyl groups;

A" is an alkylene group ($C_1$–$C_{12}$);

A°, B and D are the same or different oxyalkylene groups having the formula —OCH($R^7$)—CH($R^7$)— wherein $R^7$ is H, $CH_3$, or $C_2H_5$;

x is an integer having a value of 4 to 5;

n° is an integer having a value of 1 to 200;

n' is an integer having a value of 1 to 200; and n" is an integer having a value of 1 to 200, the sum of n°–1, n'–1 and n"–1 having a value of 2 to 200.

Some of the preferred examples of compounds of Formula V and VI include:

2-[4-(2,6-dimethylheptylidene)-amino]-ethyl methacrylate;

3-[2-(4-methylpentylidine)-amino]-propyl methacrylate;

beta-(benzylideneamino)-ethyl methacrylate;

3-[2-(4-methylpentylidene)-amino]-ethyl methacrylate;

2-[4-(2,6-dimethylheptylidene)-amino]-ethyl acrylate;

12-(cyclopentylidene-amino)-dodecyl methacrylate;

N-(1,3-dimethylbutylidene)-2-(2-methacryloxyethoxy)-ethylamine;

N-(benzylidene)-methacryloxyethoxyethylamine;

N-(1,3-dimethylbutylidene)-2-(2-acryloxyethoxy)-ethylamine; and

N-(benzylidene)-2-(2-acryloxyethoxy)ethylamine.

The compounds of Formulas V and VI hydrolyze in acid, neutral, or alkaline aqueous media to produce the corresponding primary amines or salts thereof in which the group —N=Q of the formulas becomes —$NH_2$ and O=Q. The compounds of Formulas V and VI are disclosed in U.S. Pat. Nos. 3,037,969 and 3,497,485 and any of the monomeric compounds therein disclosed may be used in the making of the copolymers to be used in water-soluble polymer portion of the compositions of the present invention.

Class 5. Any non-polymeric polyfunctional amine having at least 2 primary or secondary amino groups can be employed. Such amines include aliphatic and cycloaliphatic amines each having 2 to 10 primary or secondary amino groups and 2 to 100 carbon atoms. Preferred non-polymeric polyfunctional amines include 2 to 4 primary amino groups and 2 to 20 carbon atoms. Still further in this regard, suitable non-polymeric polyfunctional amines include, but not limited to, hexamethylene diamine; 2-methyl pentamethylene diamine; 1,3-diamino propane; 1,3-diamino pentane; dodecane diamine; 1,2-diamino cyclohexane; 1,4-diamino cyclohexane; para-phenylene diamine; 3-methyl piperidine; piperazine; N-amino ethylpiperazine; isophorone diamine; bis-hexamethylene triamine; diethylene triamine; ethylene diamine; diethylamine triamine; triethylene tetramine; tris (2-aminoethyl) amine; ethylene oxide-amine; polyoxyalkylene amines, such as, Jeffamine® D, ED and T series polyoxypropylene amine, supplied by Texaco Chemical Company of Houston, Tex.; amine-functional acrylic resins, disclosed in U.S. Pat. No. 4,120,839; trimethyl hexamethylene diamine; and tetraethylene pentamine. Mixtures of these non-polymeric polyfunctional amine can also be used. The most preferred non-polymeric polyfunctional amine is a polyoxypropylene amine having the formula:

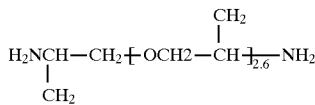

which is supplied under the trademark Jeffamine® D-230 polyoxypropylene amine by Texaco Chemical Company, Houston, Tex.

In general, the polyfunctional amines may be obtained by solution polymerization in aqueous media, either neutral, alkaline, or acidic, depending upon the particular polymer sought, as generally known in the art, for example, as taught in U.S. Pat. No. 4,119,600. The polyfunctional amines include copolymers with up to 80 percent by weight of one or more monoethylenically unsaturated monomers, such as, methyl acrylate, acrylamide and methacrylamide. Small amounts of relatively insoluble comonomers may also be used to obtain the water-soluble polyfunctional amines. The insoluble polymers may contain larger amounts of these comonomers. Such monomers include, for example, acrylic acid esters with (C1 to C18) alcohols and methacrylic acid esters with alcohols having one to 18 carbon atoms, especially (C1–C4) alkanols; styrene, vinyltoluene, vinyl acetate, vinyl chloride, vinylidene chloride, substituted styrenes, butadiene, substituted butadienes, ethylene; and the nitriles and amides of acrylic or of methacrylic acid. The particular comonomer or comonomers used in making the polyfunctional amines, depends upon the proportion of amine-containing monomer used in making the copolymer.

Alternatively, it is possible to have both the acid functional moiety and the amine functional moiety present in the same polymer back bone of the latex binder. This can be accomplished by a two stage polymerization process in which one stage contains the acid functional moiety, and the other stage contains the amine functional moiety. A process for preparing such binders is disclosed in U.S. Pat. No. 4,760,110.

The latex binder contains from 30 percent to 70 percent, preferably from 35 to 65 percent of the blend in the aqueous evaporable carrier when the latex binder is the dispersion of polymer particles, and from 25 to 50 percent, preferably from 30 to 40 percent of the blend in the aqueous evaporable carrier when a latex polymer is the solubilized polymer, all in weight percentages based on the total weight of the latex binder.

If desired and depending on the intended use of the printing ink composition, additional components may be added to the composition. These additional components include but are not limited to thickeners; rheology modifiers; dyes; sequestering agents; biocides; dispersants; pigments, such as, titanium dioxide, organic pigments, carbon black; extenders, such as, calcium carbonate, talc, clays, silicas and silicates; anti-freeze agents; plasticizers; adhesion promoters; coalescents; wetting agents; waxes; surfactants; slip additives; crosslinking agents; defoamers; colorants; preservatives; freeze/thaw protectors, corrosion inhibitors; alkali or water soluble polymers.

The present invention is also directed to a method for increasing the drying speed of a desired print pattern deposited on a substrate. The first step of the method of the present invention includes depositing one or more layers of a printing ink composition of the present invention on the surface of the substrate, by printing processes, such as, letter press, flexographic and preferably rotogravure printing process. During the deposition step, the one or more layers of the ink composition on the substrate are sequentially transferred from one or more sequentially arranged rotogravure cylinders, or one or more sequentially arranged flexographic printing plates, or one or more sequentially arranged letter press printing plates to produce the desired print pattern on the substrate.

The next step of the method of the present invention includes drying the one or more layers of the ink composition deposited on the substrate surface to produce the desired print pattern, such as, printed news papers, brochures and business forms. Due to the fast drying nature of the printing ink of the present invention, the layer deposited on the substrate dries rapidly to form a blemish resistant film on the substrate. The drying speed of the ink composition of the present invention is sufficiently fast to generally permit operation of a printing press, such as, a rotogravure printing process, to operate at line speeds of from 609 to 945 meters per minute, preferably 914 meters per minute. As a result, another layer can be safely deposited on top of the blemish resistant film on the substrate, without producing a blemish thereon. If desired, the drying rate of the one or more layers may accelerated by utilizing radiation or convective heating.

The water-based printing ink composition of the present invention is useful for general printing, such as, business forms, technical documents, brochures, catalogs, magazines, credit cards, packaging material, such as, cartons, boxes, printed laminates, such as, those having wood grain patterns, T-shirts and bank notes. The thickness of a typical print pattern obtained by using the print composition of the present invention may vary from 0.75 to 30 micrometers, preferably 0.75 to 6 micrometers. If desired the printed pattern may further be provided with a transparent overprint varnish prepared from the composition of the present invention or from any typical commercial overprint varnish.

TEST PROCEDURES

The following test procedures were used for evaluating the data reported in the Examples below:

1. The Dry Time Test

The Dry Time test used in reviewing Examples below, is similar to ASTM D1640, which is a standard test for drying of organic coatings at room temperature. The test films are applied on a non-porous substrate (glass plate) by using a wire-wound rod #5 to give a wet film thickness of 0.005±0.001 microns. The ASTM method is modified in one aspect whereby minimal finger pressure is applied to a test film surface to determine its dryness. Dry Time is the time lapsed from the application of printing ink to the glass plate until no finger impression can be made on the test film surface.

EXAMPLES

Preparation of Polymers 1–5

43.4 grams of Monomer Emulsion 1, listed in Charge Table for Monomer Emulsion 1 (ME #1) below, was added to a 5 liter stirred reactor containing 775.4 grams of deionized water (DI water) and 3.0 grams of an aqueous solution of anionic surfactant (sodium dodecyl benzene sulfonate −23% active ingredient). The reactor contents were maintained at 85° C. under nitrogen atmosphere. Fifteen grams of DI water rinse from the flask containing Monomer Emulsion 1 was added to the reactor, followed by 2.08 grams sodium carbonate in 40 grams DI water. Ten minutes later, the remainder of Monomer Emulsion 1 along with 2.08 grams of ammonium persulfate in 120 grams of DI water were slowly added to the reactor over three hours.

| Charge Table for Monomer Emulsion 1 (ME #1): | |
|---|---|
| DI water | 345.60 |
| Anionic Surfactant (23% active) | 12.56 |
| Butyl Acrylate | 744.12 |
| Methyl Methacrylate | 641.58 |

The resulting latex binder had a Brookfield viscosity of 44 cps (determined by using No. 1 spindle running @ 30 RPM) at a weight percent solids content of 50.1% and a particle size of 184 nanometers.

The same procedure as that described in preparing Polymer 1 was followed in preparing Polymers 2 through 5, each, by using Charge Tables, shown below, for Monomer Emulsions 2 through 5 (ME #2 through 5), respectively:

| Charge Table for Monomer Emulsion 2 (ME #2): | |
|---|---|
| DI water | 345.60 |
| Anionic Surfactant (23% active) | 12.56 |
| Butyl Acrylate | 744.12 |
| Methyl Methacrylate | 640.19 |
| Methacrylic acid | 1.39 |

The resulting latex binder had a Brookfield viscosity of 141 cps (determined by using No. 1 spindle running @ 30 RPM) at a weight percent solids content of 49.7% and a particle size of 162 nanometers.

| Charge Table for Monomer Emulsion 3 (ME #3): | |
|---|---|
| DI water | 345.60 |
| Anionic Surfactant (23% active) | 12.56 |
| Butyl Acrylate | 739.96 |
| Methyl Methacrylate | 638.81 |
| Methacrylic acid | 6.93 |

The resulting latex binder had a Brookfield viscosity of 109 cps (determined by using No. 1 spindle running @ 30 RPM) at a weight percent solids content of 50.0% and a particle size of 170 nanometers.

| Charge Table for Monomer Emulsion 4 (ME #4): | |
|---|---|
| DI water | 345.60 |
| Anionic Surfactant (23% active) | 12.56 |
| Butyl Acrylate | 744.12 |
| Methyl Methacrylate | 627.72 |
| Methacrylic acid | 13.85 |

The resulting latex binder had a Brookfield viscosity of 68 cps (determined by using No. 1 spindle running @ 30 RPM) at a weight percent solids content of 50.0% and a particle size of 171 nanometers.

| Charge Table for Monomer Emulsion 5 (ME #5): | |
|---|---|
| DI water | 345.60 |
| Anionic Surfactant (23% active) | 12.56 |
| Butyl Acrylate | 744.12 |
| Methyl Methacrylate | 572.28 |
| Methacrylic acid | 69.30 |

The resulting latex binder had a Brookfield viscosity of 91 cps (determined by using No. 1 spindle running @ 30 RPM) at a weight percent solids content of 50.5% and a particle size of 161 nanometers.

Polymers 1 through 5 had a calculated Tg of 15° C. as obtained by using Fox Equation, disclosed on page 20 in "The Characterization of Polymers", Publication No. CM-106 9/76, published by Rohm and Haas Company, Philadelphia, Pa.

Preparation of Polymer 6:

Polymer 6, which was a two stage polymer, was prepared by reacting various feeds described below in Charge Table for Polymer 6. The Reactor Charge Feed was added to a reactor maintained under a nitrogen blanket at 85° C. Feed X was then added to the reactor, followed 2 minutes later, by the addition of Feed A-1. The reactor contents were maintained for 30 minutes at 82° C. Thereafter, emulsified Feed B-1 was added gradually followed by Rinse # 1. Feed E was then added and the reactor contents were held at 83° C. for 30 minutes. Thereafter, emulsified Feed B-2 and Feed A-2 were simultaneously added in 90 minutes while the reactor contents were held at 85° C. Rinse # 2 was added and the reactor contents were held at 85° C. for 2 hours and then cooled.

The resulting latex binder had a Brookfield viscosity of 1550 cps (determined by using No. 2 spindle running @ 12 RPM) at a weight percent solids content of 46.2% and a particle size of 105 nanometers.

Charge Table for Polymer 6:
Reactor Charge Feed

|  | In grams |
|---|---|
| Deionized water | 1004.3 |
| Sodium bicarbonate | 2.1 |
| 50% Feed C | 485.3 |
| Feed A-1 | |
| Ammonium persulfate | 12.8 |
| Deionized water | 25.0 |
| Feed B | |
| Butyl methacrylate | 384.7 |
| Styrene | 256.5 |
| Ethylhexyl acrylate | 145.3 |
| Methyl methacrylate | 42.7 |
| Feed X | |
| Feed B-1 (Pre-emulsion) | 50.0 |
| Feed C | |
| Sodium dodecyl benzene sulfonate | 35.3 |
| Deionized water | 936.3 |
| Feed D | |
| Surfactant* | 34.2 |
| (*Triton ® 101 Nonyl phenoxy polyethoxy ethanol, supplied by Union Carbide, Danbury, Connecticut) | |
| Feed B-1 | |
| Acrylic acid | 51.3 |
| 100% Feed B | 829.4 |
| 25% Feed C | 242.9 |
| 50% Feed D | 17.1 |
| Rinse #1 | |
| Deionized water | 50.0 |
| Feed B-2 | |
| t-Butyl aminoethyl methacrylate | 68.8 |
| Hydroxyethyl methacrylate | 17.1 |
| Butyl methacrylate | 567.5 |
| Styrene | 73.8 |
| Ethylhexyl acrylate | 145.3 |
| Methyl methacrylate | 42.7 |
| 25% of Feed C | 242.9 |
| 50% of Feed D | 17.1 |
| Rinse #2 | |
| Deionized water | 50.0 |
| Feed A-2 | |
| Ammonium persulfate | 6.4 |
| Deionized water | 12.5 |
| Feed E | |
| Ammonium hydroxide | 22.0 |

The stage 1 of Polymer 6 had a calculated Tg of 33° C. and stage 2 had a Tg of 15° C.

Preparation of Polyamine 1

A five liter stirred reactor containing 1500 grams of deionized and deoxygenated water was heated to 60° C. under nitrogen. Seven grams of 0.15% aqueous $FeSO_4.7H_2O$ solution and 2.0 grams of a 1% aqueous tetra sodium (ethylene dinitrilo)-tertaacetate were added to the reactor. Feeds Nos. 1 and 2, listed below, were then simultaneously added to the reactor over a 3 hour period:

Feed No. 1

500.0 grams 2-(3-oxazolidinyl)ethyl methacrylate (OXEMA)

500.0 grams deionized water 5.0 grams 70% aqueous tertiary-butyl hydroperoxide (TBHP)

Feed No.2

5.0 grams sodium formaldehyde sulfoxylate.$H_2O$ (SFS) diluted with 14.4 mL DI water.

One hour after the addition of Feed Nos. 1 and 2, 0.65 grams of 70% TBHP and 0.15 grams SFS in 5.0 grams of DI water were added to the reactor. On hour thereafter, the reactor contents were cooled to room temperature, and 10.0 grams of 29% aqueous ammonium hydroxide were added to yield a clear amber solution of total solids content at 18.6%, pH 8.3 and Brookfield viscosity (determined by using No. 1 spindle running @ 60 rpm) of 21 cps.

Preparation of Polyamine 2

A five liter stirred reactor containing 1500 grams of deionized deoxygenated water was heated to 60° C. under nitrogen. Seven grams of 0.15% aqueous $FeSO_4.7H_2O$ and 2.0 grams of a 1% aqueous tetra sodium (ethylene dinitrilo)-tetra acetate were added to the reactor. Feed Nos. 3, 4 and 5, listed below, were then simultaneously added over a 3 hour period to the reactor:

Feed No. 3

500.0 grams dimethylaminoethyl methacrylate 500.0 grams deionized water

Feed No. 4

5.0 grams aqueous tertiary-butyl hydroperoxide (t-BHP) @ 70% diluted with 14.4 mLs of DI water.

Feed No. 5

5.0 grams sodium formaldehyde sulfoxylate.$2H_2O$ (SFS) diluted with water to 14.4 mLs.

One hour after the addition of Feed Nos. 3, 4 and 5, 0.65 grams of 70% TBHP and 0.15 grams SFS in 5.0 grams of DI water were added to the reactor. On hour thereafter, the reactor contents were cooled to room temperature, and 10.0 grams of 29% aqueous ammonium hydroxide were added to yield a clear amber solution of total solids content at 16.9%, pH 8.8 and Brookfield viscosity (determined by using No. 1 spindle running @ 60 rpm) of 44 cps.

Examples 1–10

Examples 1–10 were prepared according to the following standard procedure described below:

Polymers 1–6 were preneutralized with constant stirring for 15 minutes with a 7% solution of $NH_4OH$ and diluted with DI water to a desired pH and solids percentage shown in Table 1 below. Examples 2,4, 6, 8 and 10, were prepared by blending polymers 1–6 with Polyamine-1 [poly(2-(3-oxazolidinyl)ethyl methacrylate)] added at a level of 2% by weight based on the latex binder solids. These Examples were then compared for Dry Time with Examples 1, 3, 5, 7 and 9 not containing Polyamine-1. The acid functionality refers to the total weight percent of methacrylic acid copolymerized in Polymer, based on the total weight of Polymer.

TABLE 1

| Example | Polymer Used (weight % acid) | pH | Solids | Polyamine 1 | Dry Time |
| --- | --- | --- | --- | --- | --- |
| Example 1 | Polymer 1 (0% acid) | 10.02 | 35.64% | NONE | 110 seconds |
| Example 2 | Polymer 1 (0% acid) | 10.03 | 36.04% | 2.0% | 45 seconds |
| Example 3 | Polymer 2 (0.1% acid) | 10.01 | 35.63% | NONE | 230 seconds |
| Example 4 | Polymer 2 (0.1% acid) | 10.07 | 36.34% | 2.0% | 70 seconds |
| Example 5 | Polymer 3 (0.5% acid) | 9.91 | 36.30% | NONE | 285 seconds |
| Example 6 | Polymer 3 (0.5% acid) | 9.94 | 36.21% | 2% | 70 seconds |
| Example 7 | Polymer 4 (1.0% acid) | 9.99 | 37.52% | NONE | 250 seconds |
| Example 8 | Polymer 4 (1.0% acid) | 9.98 | 35.88% | 2% | 80 seconds |
| Example 9 | Polymer 5 (5.0% acid) | 10.10 | 35.61% | NONE | 220 seconds |
| Example 10 | Polymer 5 (5.0% acid) | 9.96 | 36.36% | 2% | 100 seconds |
| Comparative A[1] | | | 37.10% | | 110 seconds |

[1]Comparative A is Joncryl ™ 537 supplid by S.C. Johnson, Racine, Wisconsin.

It is seen from Table 1, that applicants have unexpectedly discovered that Examples which included Polyamine-1 had a faster Dry Time than those without Polyamine-1. It was also discovered that as the percent acid level in the Polymers 1 through 5 was increased, Dry Time also increased. Comparative A was a commercial water-based ink composition marketed for graphic arts. It was seen that Dry Time of Comparative A was longer than Dry Time of Examples 2, 4, 6, 8, and 10, all of which contained Polyamine-1.

Examples 11–16

For Examples 11–16, the same procedure as that for Examples 1–10 was employed, except for the level of Polyamine-1 or Polyamine-2 [poly(dimethylaminoethyl methacrylate)], which was varied in accordance with Table 2 shown below:

TABLE 2

| Example | Polymer Used | pH | Solids | Polyamine Used | Dry Time |
| --- | --- | --- | --- | --- | --- |
| Example 11 | Polymer 4 | 9.99 | 37.52% | NONE | 250 seconds |
| Example 12 | Polymer 4 | 9.99 | 35.60% | 0.5% Polyamine-1 | 150 seconds |
| Example 13 | Polymer 4 | 9.98 | 35.88% | 2.0% Polyamine-1 | 80 seconds |
| Example 14 | Polymer 4 | 9.96 | 37.22% | 5.0% Polyamine-1 | 70 seconds |
| Example 15 | Polymer 4 | 9.98 | 36.31% | 10.0% Polyamine-1 | 240 seconds |
| Example 16 | Polymer 4 | 9.99 | 35.65% | 2.0% | 150 seconds |

It is seen from Table 2 that applicants have unexpectedly discovered that the addition of Polyamine-1 in Examples 12–16 substantially reduced Dry Time when compared to Example 11. Increasing the Polyamine-1 level initially caused a decrease in Dry Time, however at higher Polyamine-1 levels, an increase in Dry Time was observed. Use of Polyamine 2 also resulted in decreasing Dry Time.

Examples 17–22

For Examples 17–22, the same procedure as that used in Examples 1–10 was employed, except for the type of neutralizing base, which was varied in accordance with Table 3 shown below:

TABLE 3

| Example | Polymer Used | Neutralizing Base | Solids | Polyamine-1 | Dry Time |
| --- | --- | --- | --- | --- | --- |
| Example 17 | Polymer 4 | NH₄OH pH = 9.99 | 37.52% | NONE | 250 seconds |
| Example 18 | Polymer 4 | NH₄OH pH = 9.98 | 35.88% | 2.0% | 80 seconds |
| Example 19 | Polymer 4 | NaOH pH = 9.97 | 37.59% | NONE | 340 seconds |
| Example 20 | Polymer 4 | NaOH | 38.27% | 2.0% | 190 seconds |
| Example 21 | Polymer 4 | MEA pH = 9.96 | 38.60% | NONE | 280 seconds |
| Example 22 | Polymer 4 | MEA pH = 9.96 | 38.62% | 2.0% | 150 seconds |

Abbreviations used for the neutralizing base in Table 3:
NH₄OH = ammonium hydroxide (7% by weight in water)
NaOH = sodium hydroxide (5% by weight in water)
MEA = 2-methylaminoethanol (100%)

It is seen from Table 3, that applicants had unexpectedly discovered that the addition of Polyamine-1 greatly reduced Dry Time, regardless of the type of neutralizing base used. However, the use of the volatile base (NH₃) dissolved in water provided optimum reduction in Dry Time.

Examples 23 and 24

For Examples 23 and 24, the same procedure as that used in Examples 1–10 was employed.

TABLE 4

| Example | Polymer Used | pH | Solids | Polyamine-1 | Dry Time |
| --- | --- | --- | --- | --- | --- |
| Example 23 | Polymer 6 (2.8% acid/3.8% amine) | 9.67 | 36.28% | NONE | 200 seconds |
| Example 7 | Polymer 4 (1.0% acid) | 9.99 | 37.52% | NONE | 250 seconds |
| Example 9 | Polymer 5 (5.0% acid) | 10.10 | 35.61% | NONE | 220 seconds |
| Example 24 | Polymer 6 (2.8% acid/3.8% amine) | 9.69 | 35.04% | 2.0% | 130 seconds |

It is seen from Table 4 that applicants had unexpectedly discovered that the addition of Polyamine-1 greatly reduced Dry Time, even when the polymer was a multi-stage polymer, with one stage being an acid containing polymer and the other stage being a low molecular weight amine containing polymer. In addition, applicants had unexpectedly discovered that Polymer 6 which contained acid in one stage and amine in the other stage, showed a shorter Dry Time (Example 23) than comparable Polymers (Example 7 and 9) which did not contain the amine stage.

Examples 25 and 26

To Example 7 and 8 an aqueous pigment dispersion[1] was added and mixed on a bench top stirrer for 15 minutes to prepare Examples 25 and 26 described in Table 9 below:

TABLE 5

| | Example 25 | Example 26 |
| --- | --- | --- |
| Example 7 | 40.0 parts | |
| Example 8 | | 40.0 parts |
| Aqueous pigment dispersion[1] | 50.0 parts | 50.0 parts |
| Water | 10.0 parts | 10.0 parts |

[1] Liquaflex® Yellow YD-3000 supplied be Drew Graphics, Cincinnati, Ohio.

Table 6 below lists Dry Times for Examples 25 and 26 against a comparative commercial ink composition B.

TABLE 6

| Example | Solids | Dry Time |
| --- | --- | --- |
| Example 25 | 37.2% | 80 seconds |
| Example 26 | 38.0% | 55 seconds |

TABLE 6-continued

| Example | Solids | Dry Time |
| --- | --- | --- |
| Comparative B[1] | | 10.0 seconds |

[1]Comparative B (C-4000) is a conventional pigmented water-based printing ink supplied for the graphic arts industry, as supplied by Sun Chemical SpA, V. Delle Due Case, 2-50127 Firenze, Italy.

It is seen from Table 6, that applicants had unexpectedly discovered that the addition of Polyamine-1 (Example 26) reduced Dry Time when compared to Example (Example 25), even when the polymer contained a pigment dispersion. Applicants had also unexpectedly discovered that Example 26 had a shorter Dry Time than the comparative example (Comparative B).

What is claimed is:

1. A printing ink composition comprising:
   a base, and
   (a) a blend of a latex binder with 0.5 to 10 weight percent based on the total weight of binder solids of a polyfunctional amine, or
   (b) an amine modified latex binder, or
   (c) a combination of said blend and said amine modified latex binder, wherein said latex binder and said amine modified latex binder are anionically stabilized, and wherein said latex binder comprises an amount of said base sufficient to raise the pH of said latex binder to a point wherein essentially all of said polyfunctional amine in said blend, or essentially all of said amine modified latex binder, or essentially all of said combination of said blend and said amine modified latex binder is in a deprotonated state.

2. The composition of claim 1 wherein said polyfunctional amine is polymerized from 20 weight percent to 100 weight percent based on the total weight of polyfunctional amine solids of an amine monomer.

3. The composition of claim 1 wherein said amine modified latex binder is polymerized from 0.5 weight percent to 20 weight percent based on the total weight of latex binder solids of an amine monomer.

4. The composition of claim 2 or 3 wherein said amine monomer is selected from the group consisting of dimethylaminopropylmethacrylamide, oxazolidinoethylmethacrylate, 2-isopropenyl-2-oxazoline and dimethylaminoethylmethacrylate.

5. The composition of claim 1 wherein said latex binder or said amine modified latex binder has an acid number in the range of from 0 to 390.

6. The composition of claim 1 wherein said latex binder or said amine modified latex binder has a Tg in the range of from −20° C. to 150° C.

7. A fast-dry printing ink composition comprising:
a volatile base, and
(a) a blend of a latex binder with 0.5 to 10 weight percent based on the total weight of latex binder solids of a polyfunctional amine, said latex binder having an acid number in the range of from 0.8 to 390, or
(b) an amine modified latex binder having an acid number in the range of from 3 to 390, or
(c) a combination of said blend and said amine modified latex binder, wherein said latex binder and said amine modified latex binder are anionically stabilized, and wherein said latex binder of said ink comprises an amount of said volatile base sufficient to raise the pH of said latex binder to a point wherein essentially all of said polyfunctional amine in said blend, or essentially all of said amine modified latex binder, or essentially all of said combination of said blend and said amine modified latex binder is in a deprotonated state.

8. A method for increasing the drying speed of a desired print pattern deposited on a substrate, said method comprising:
depositing one or more layers of a printing ink composition on the surface of said substrate, said ink composition comprising:
a base, and
(a) a blend of a latex binder with 0.5 to 10 weight percent based on the total weight of latex binder solids of a polyfunctional amine, or
(b) an amine modified latex binder, or
(c) a combination of said blend and said amine modified latex binder, wherein said latex binder and said amine modified latex binder are anionically stabilized, and wherein said latex binder comprises an amount of said base sufficient to raise the pH of said latex binder to a point wherein essentially all of said polyfunctional amine in said blend, or essentially all of said amine modified latex binder, or essentially all of said combination of said blend and said amine modified latex binder is in a deprotonated state; and drying said one or more layers of said ink composition on said substrate surface to produce said desired print pattern thereon.

9. The method of claim 8 wherein said one or more layers of said ink composition on said substrate are sequentially transferred from one or more sequentially arranged rotogravure cylinders, or one or more sequentially arranged flexographic printing plates, or one or more sequentially arranged letter press printing plates.

10. A method for printing a desired print pattern on a substrate comprising:
depositing on the surface of said substrate a layer of a fast-dry printing ink composition comprising:
a volatile base, and
(a) a blend of a latex binder with 0.5 to 10 weight percent based on the total weight of latex binder solids of a polyfunctional amine, or
(b) an amine modified latex binder, or
(c) a combination of said blend and said amine modified latex binder, wherein said latex binder and said amine modified latex binder are anionically stabilized, and wherein said latex binder comprises an amount of said volatile base sufficient to raise the pH of said latex binder to a point wherein essentially all of said polyfunctional amine in said blend, or essentially all of said amine modified latex binder, or essentially all of said combination of said blend and said amine modified latex binder is in a deprotonated state;

drying said layer to form a blemish resistant film on said substrate;

depositing another layer of said printing ink composition on top of said blemish resistant film; and drying said another layer to produce said desired print pattern on said substrate.

11. The method of claim 10 further comprising accelerating said drying of said layers by radiation or convective heating.

12. A substrate having a desired print pattern thereon produced in accordance with the method of claim 8 or 10.

13. The composition of claim 1 or 7 wherein said polyfunctional amine is polymerized from one or more monomers comprising:
aminoalkyl vinyl ethers,
acrylamide or acrylic esters,
N-acryloxyalkyl-oxazolidines and N-acryloxyalkyltetrahydro-1,3-oxazines and the corresponding components in which the "alkyl" linkage is replaced by alkoxyalkyl and poly(alkoxy-alkyl),
acryloxy-ketimines and acryloxy-aldimines, and
any non-polymeric polyfunctional amine having at least 2 primary or secondary amino groups.

14. The method of claim 8 or 10 wherein said polyfunctional amine is polymerized from one or more monomers comprising:
aminoalkyl vinyl ethers,
acrylamide or acrylic esters,
N-acryloxyalkyl-oxazolidines and N-acryloxyalkyltetrahydro-1,3-oxazines and the corresponding components in which the "alkyl" linkage is replaced by alkoxyalkyl and poly(alkoxy-alkyl),
acryloxy-ketimines and acryloxy-aldimines, and
any non-polymeric polyfunctional amine having at least 2 primary or secondary amino groups.

* * * * *

UNITED STATES PATENT AND TRADEMARK OFFICE
CERTIFICATE OF CORRECTION

PATENT NO : 5849833
DATED : December 15, 1998
INVENTOR(S) : Caren Ann Puschak et al.

It is certified that error appears in the above-identified patent and that said Letters Patent is hereby corrected as shown below:

On title page, item 75 Inventors:
 replace "Anne Margarat Bacho"
 with --Anne Margaret Bacho--.

Col. 15, Table 2, Example 16:

insert --Polyamine-2--.

Col. 18, line 47
 replace "Comparative B$^1$ 10.0 seconds"
 with --Comparative B$^1$ 100 seconds--.

Signed and Sealed this

Eighteenth Day of May, 1999

Attest:

Q. TODD DICKINSON

*Attesting Officer*    *Acting Commissioner of Patents and Trademarks*